United States Patent [19]

Reincke

[11] Patent Number: 5,396,962
[45] Date of Patent: Mar. 14, 1995

[54] DEVICE FOR MAKING SOWING FURROWS IN A LAWN

[75] Inventor: Marinus Reincke, Langbroek, Netherlands

[73] Assignee: Redexim Hanel - en Exploitatie Maatschappij B.V., Netherlands

[21] Appl. No.: 209,613

[22] Filed: Mar. 11, 1994

Related U.S. Application Data

[63] Continuation of Ser. No. 943,807, Sep. 11, 1992, abandoned.

[30] Foreign Application Priority Data

Sep. 13, 1991 [NL] Netherlands .................. 9101552

[51] Int. Cl.6 .................... A01B 15/16; A01B 49/04
[52] U.S. Cl. .................... 172/604; 111/901; 111/143
[58] Field of Search ............ 172/705, 711, 764, 643, 172/387, 393, 394, 135, 174, 182, 604, 515, 516, 389; 111/901, 902, 139, 140, 141, 143

[56] References Cited

U.S. PATENT DOCUMENTS

| 407,062 | 7/1889 | Cook | 172/515 |
|---|---|---|---|
| 409,818 | 8/1889 | Bell | 172/604 X |
| 1,747,525 | 2/1930 | Nagy . | |
| 1,762,907 | 6/1930 | Wolf | 172/643 |
| 2,136,607 | 11/1938 | Benjamin | 172/604 X |
| 2,164,214 | 6/1939 | Lindgren | 172/604 X |
| 2,197,424 | 4/1940 | Benjamin | 172/604 X |
| 2,989,129 | 6/1991 | Sisk | 172/515 |
| 3,398,616 | 8/1968 | Elineau | 83/305 |
| 4,217,835 | 8/1980 | Fox | 172/394 X |
| 4,250,968 | 2/1981 | Fox | 172/60 |

FOREIGN PATENT DOCUMENTS

| 485546 | 8/1952 | Canada | 172/643 |
|---|---|---|---|
| 0214956 | 9/1985 | European Pat. Off. . | |
| 2444395 | 12/1979 | France . | |
| 2627933 | 3/1988 | France . | |
| 2646748 | 5/1989 | France . | |
| 2627933 | 9/1989 | France | 172/604 |

Primary Examiner—Clifford D. Crowder
Assistant Examiner—Paul C. Lewis
Attorney, Agent, or Firm—Webb Ziesenheim Bruening Logsdon Orkin & Hanson

[57] ABSTRACT

A device for making sowing furrows in a lawn, provided with a mobile frame having a number of disc-like cutting members disposed adjacently of each other transversely of the direction of forward movement thereof and drivable round a horizontal shaft. According to the invention the cutting edge of each disc-like knife has a continually varying distance to the shaft of the knife, this such that the difference between the largest and smallest distance to the shaft of the knife lies in the order of magnitude of the cutting depth and the knife has one or more outward protruding lobes.

3 Claims, 4 Drawing Sheets

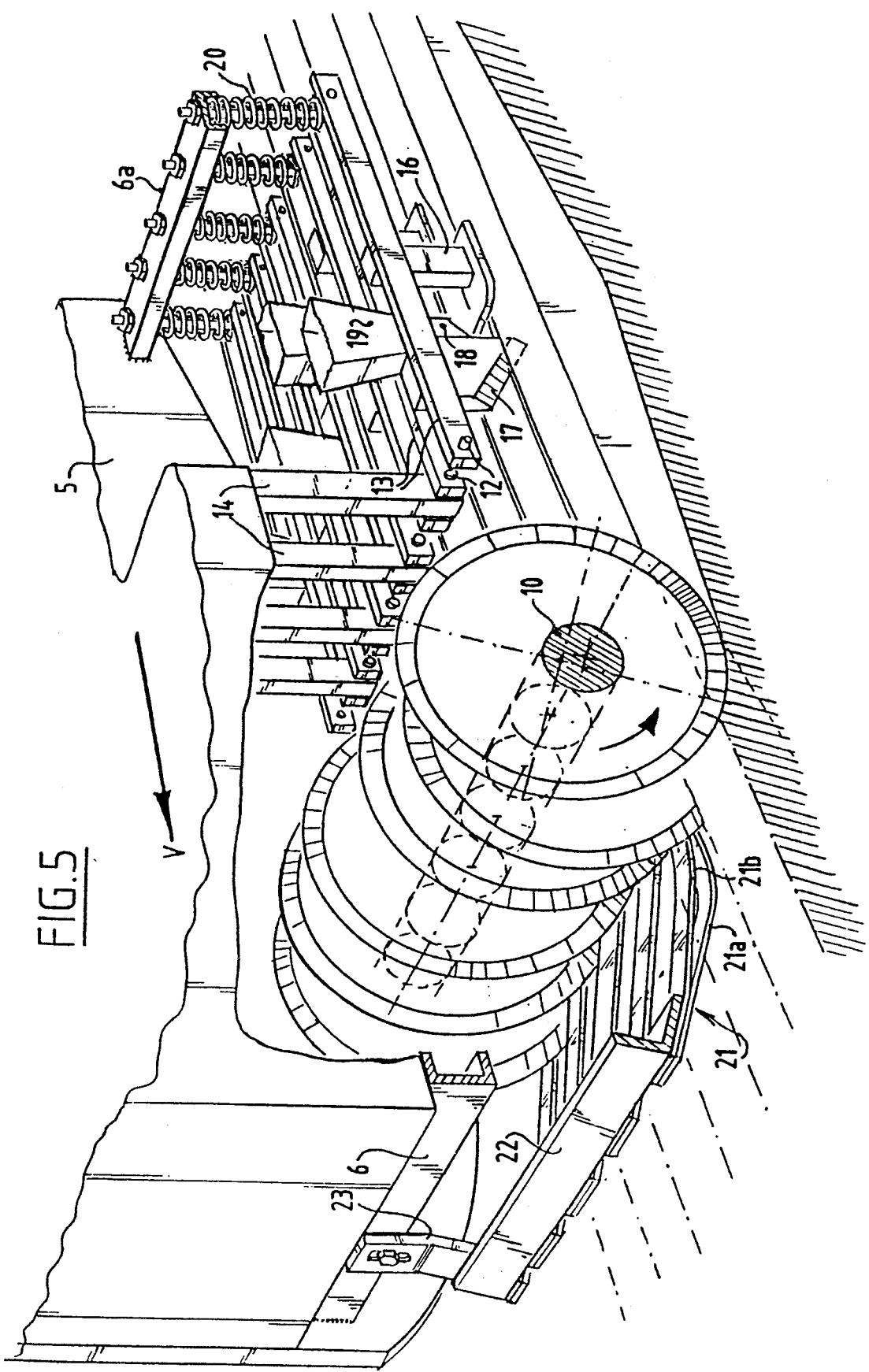

DEVICE FOR MAKING SOWING FURROWS IN A LAWN

This is a continuation of application Ser. No. 07/943,807, filed on Sep. 11, 1992, now abandoned.

BACKGROUND OF THE INVENTION

1) Field of the Invention

The invention relates to a device for making sowing furrows in a lawn, provided with a mobile frame having a number of disc-like cutting members disposed adjacently of each other transversely of the direction of forward movement thereof and drivable round a horizontal shaft.

2) Description of the Prior Art

Such devices are known and typically form part of seeder machines with which grass lawns, and the greens of golf courses in particular, can be improved by first cutting furrows therein at regular distances, spreading grass seed therein and subsequently re-closing the furrows. As a rule these machines are herein suspended from the rear part of an agricultural tractor.

The quality of lawns, and particularly the greens of golf courses, can hereby and in combination with regular mowing hereof be preserved for a long period.

Difficulties can arise the older the grass cover becomes. The ground then becomes increasingly more compacted and more difficult to penetrate. In addition, depending on the quality of the maintenance in the recent past, "felt-forming" is often encountered in greens. A felt-like layer is then found to have formed on the green from parts of the grass dying off. This layer is comparatively tough and therefore difficult to cut.

The nature of the difficulties encountered in these conditions during the making of the seed furrows depends on the type of cutting member with which the machine is equipped.

The cutting members can be classified into two types, one type that is provided with a number of leaves or blades extending radially from the shaft of the cutting member and a type with a disc-shaped cutting body. A cutting member of the first type is in fact a chopping or striking member. With its rotating arms such a member can beat its way relatively easily through more compacted ground and also through tough felt layers. On the other hand, parts of the ground respectively the felt layer are therein broken loose, which parts ate then carried along through the forming seed furrow and are thrown up at the rear as loose material that must later be removed. This material can moreover result in blockage of the seed supply means located at the rear.

Disc-like cutting members operate much more cleanly. Such cutting blades on the other hand penetrate less easily into more solid ground and tough felt layers and often have the tendency therein to rise upward out of their active position and to run over the ground and the tough felt layer. In order to nevertheless hold the discs at depth counter to this tendency, a proportionally large external force directed vertically downward has to be exerted and much additional drive power is required. Attempts have already been made to remedy this problem by arranging recesses lying distributed regularly along the periphery of the round cutting disc. Thus obtained was a sort of circular saw which certainly penetrated more easily through more solid ground and tough felt layers but which still transported loose material through the forming seed furrow to the rear and left it behind on the grass cover for improvement.

SUMMARY OF THE INVENTION

The invention now has for its object to improve the cutting members such that soil or felt portions are no longer transported to the rear and thrown up to ground level, while they can therein still penetrate easily through more compacted ground and tough felt layers.

According to the invention this objective is achieved in that the cutting edge of each disc-like knife has a continually varying distance to the shaft of the knife, this such that the difference between the largest and smallest distance to the shaft of the knife lies in the order of magnitude of the cutting depth and the knife has one or more outward protruding lobes.

With a thus embodied knife a force is exerted at the point of entry into the ground which varies continually in magnitude and direction but which is always directed inclining forward and downward. Although the degree of non-roundness of such a disc is not exceptionally large in view of the cutting depth of only a few centimeters, it has been found in tests that a cutting knife in this embodiment does indeed penetrate more easily through more solid ground, respectively cuts more easily through tough felt layers. On the basis of these tests it is further assumed that the tendency to vibration of the non-round cutting discs has an additionally positive influence on this effect.

The cutting discs of the device according to the invention can be embodied in different ways. The simplest form is that of a round disc whereof the shaft is placed eccentrically. Another suitable form is that of an ellipse.

A preferred embodiment of the device according to the invention consists herein that in its operating position the device supports on the ground by means of a number of separate sliding strips which lie on the strips of ground between the adjacently disposed cutting discs and which give in height direction. These sliding strips together form a bearing support which adapts easily to undulations in the terrain for working, while on the other hand the separate, yielding sliding strips have no adverse consequences for the positive effect of the non-round discs with a tendency to vibrate.

The invention is further elucidated hereinbelow with reference to the drawing of an embodiment.

BRIEF DESCRIPTION OF THE DRAWINGS

FIG. 5 shows a perspective view of a portion of the seeder device having an eccentrically mounted disc;

DESCRIPTION OF THE PREFERRED EMBODIMENTS

Figure 1:
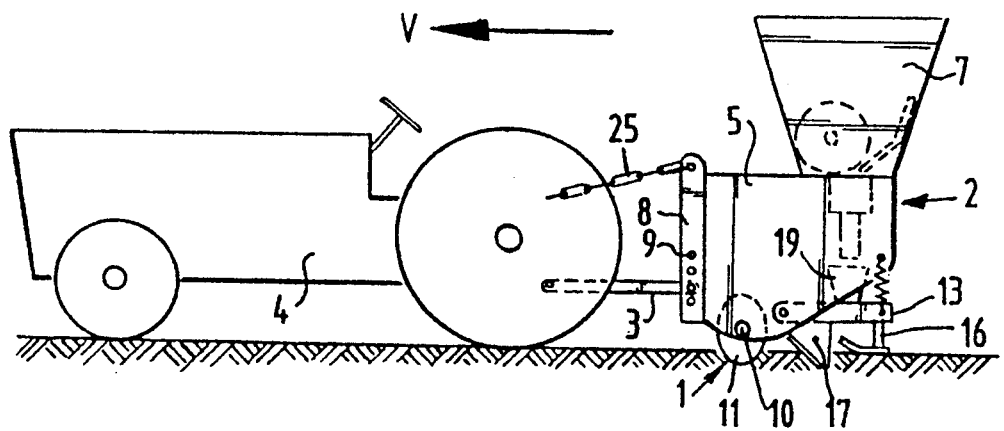
FIG. 1 is a side view of a combination of a tractor and a seeder device which is suspended on the rear part thereof and in which the device according to the invention is used.
Figure 2:
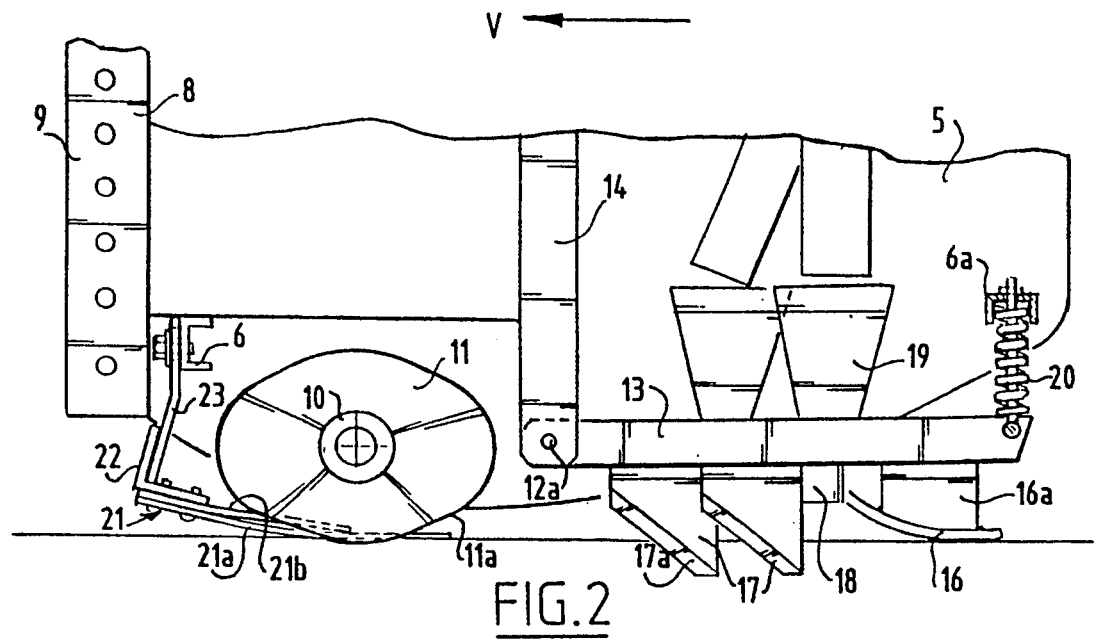
FIG. 2 shows a schematic vertical lengthwise section through the seeder device of FIG. 1.
Figure 3:
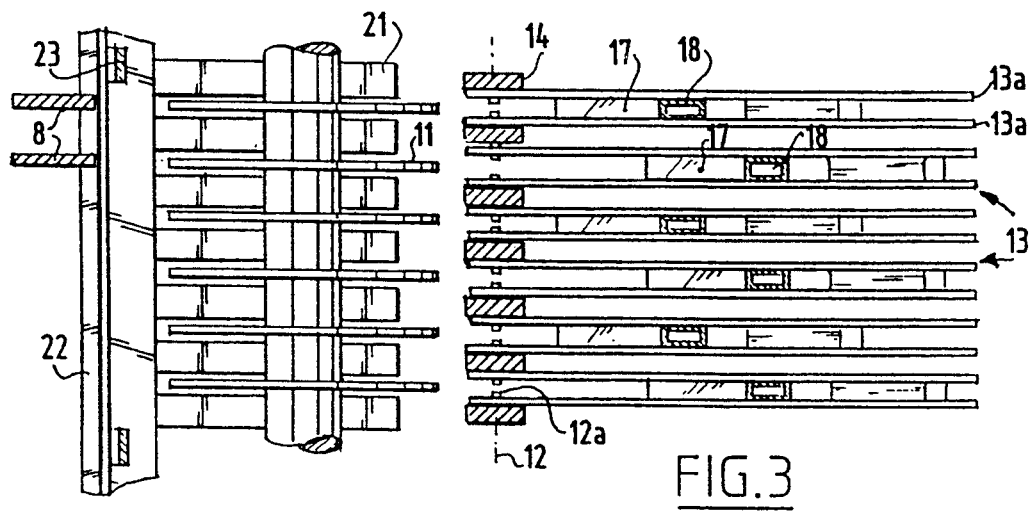
FIG. 3 shows a horizontal section through the device of FIG. 2.

In FIG. 1–3 the device 1 according to the invention is shown in combination with a sowing device 2 disposed therebehind so as to together form a seeder device. This device is suspended in FIG. 1 on the lifting rod mechanism 3 of a tractor 4. The device has a frame comprising two side plates 5 and a number of cross beams 6 mutually connecting these side plates. Designated with 7 is a seed supply container which is fixed to the lower portion from above between both side plates 5.

Situated on the forward side of the frame 5, 6 are two mutually parallel, substantially vertically oriented plate strips 8. These plate stripe 8 are provided with a series of mounting holes 9 located one above another and in mutually opposite pairs. Depending on the desired cutting depth and the condition of the terrain for working, a suitable pair of mutually aligned holes 9 in each pair of plate strips 8 is selected as point of engagement for the relevant coupling rods 3 of the tractor 4.

Designated with 10 is a shaft which extends transversely of the direction of forward movement V of the device and which is rotatably mounted in support bearings (not shown) between the side plates 5 of frame 5, 6.

The shaft protrudes with one end outside the relevant side plate 5 in order to be driven by a transmission mechanism (not shown) which is coupled in known manner to the customary power take-off shaft of the tractor.

A number of (for instance twenty) flat cutting discs 11 is fixedly mounted on the shaft 10 at mutual distances of for instance 3–6 cm. These cutting discs 11 have a non-round form which will be further described hereinbelow.

Situated behind each of the cutting discs 11 is a bearing arm 13 pivotable on a horizontal, transversely directed shaft 12. The bearing arms 13 take a dual form, this in the form of two bearing arm strips 13a which during operation are oriented roughly horizontally to the rear. The bearing arm strips 13a herein engage at their leading ends round pivot journals 12a which protrude on either side of a support 14 suspended from the frame (see FIG. 3 and FIG. 5). During operation each bearing arm 13 supports close to its rear end on the ground via a shoe 16, whereof a standing body portion 16a is fixed between the relevant bearing arm strips 13a using for instance bolts. Further arranged on each bearing arm 13 is a stationary knife 17 located in the path of the rotating cutting disc 11 situated in front of it. This cutting knife has the function of bringing the seed furrow made by the rotating cutting disc located in front to the desired (virtually constant) depth and of widening it a little to facilitate introduction of the grass seed. The knives 17 are provided for this purpose with a cutting edge 17a running obliquely downward to the rear and are fastened, for instance with bolts, between both bearing arm strips 13a. Situated directly behind each stationary cutting knife 17 and just in front of the relevant shoe 16 is the outflow aperture 18 of a seed spreading tube 19 with its outlet orifice fitted between both bearing am strips 13a.

The stationery knives 17 carried by the different bearing arm strips located mutually adjacent in transverse direction lie alternately staggered a little to the front and a little to the rear. The same applies to the associated seed outflow orifices of the seed spreading tubes 19 and the shoes 16. (See FIG. 2 and 3). The bearing arms 13 are in addition each loaded in downward direction at their rear end with a pressure spring 20 which supports on the other side against the underside of one of the cross beams 6a of frame 5, 6. During the operation the shoes 16, and therewith the knives 17, will thus be able to follow the undulations occurring in the terrain because they can move upward counter to the action of the springs 20.

Figure 4:
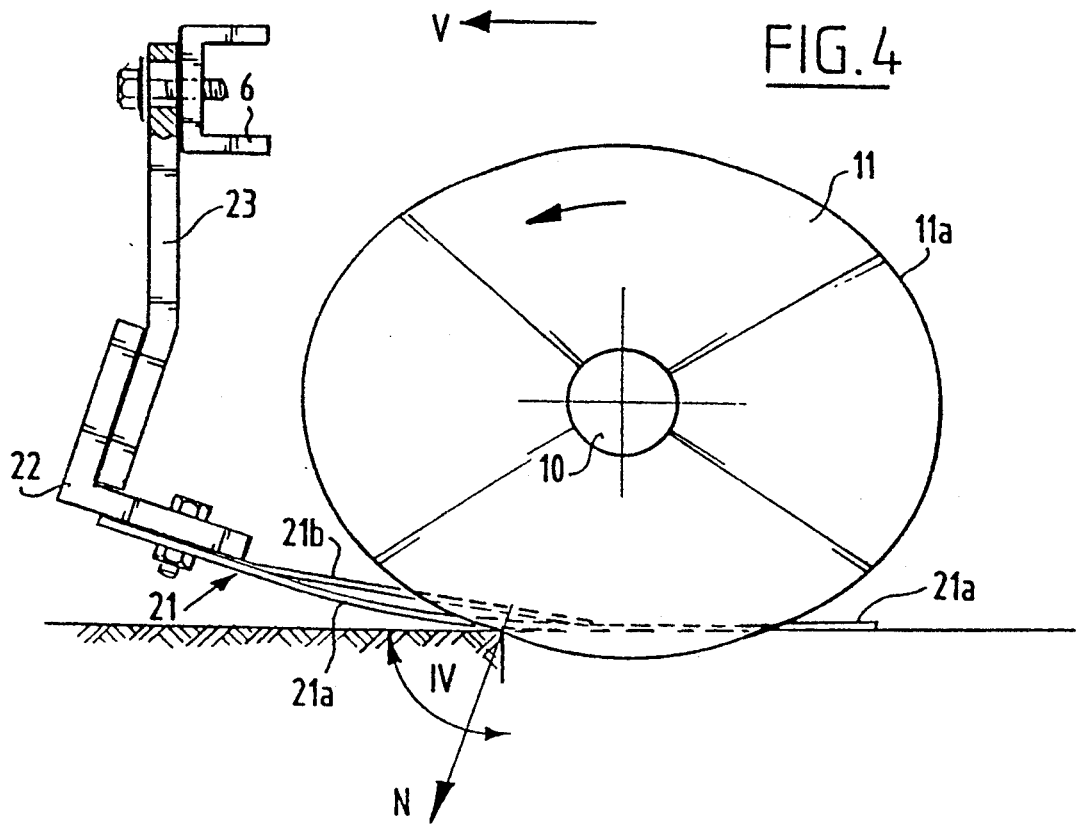
FIG. 4 shows a schematic side view on a still larger scale of a non-round cutting disc according to the invention and a sliding strap co-acting therewith.

We now return to the embodiment of the rotating cutting discs 11. As previously noted, these cutting discs have a non-round form. In the embodiment shown in FIG. 2 and 4 elliptical cutting discs are employed. The periphery thereof forms a continually running cutting edge 11a, the distance of which to the shaft 10 varies between a maximum and a minimum.

The difference between these lies in the order of magnitude of a cutting depth applied during operation which may vary for instance between 2 and $3\frac{1}{2}$ cm. As can be seen in FIG. 2, the cutting edge can be considered as a mathematical rhomb which is rounded in the angles.

On a test machine cutting discs were used wherein the distance from the cutting edge to the rotating shaft varied from 68 to 80 mm.

During operation a normal force N is exerted on the ground within the quadrant designated with IV by the cutting edge 11a of a cutting disc 11 moving in the arrow direction (FIG. 4), the direction and magnitude of this force changing continually.

It has been found that a cutting disc with a tendency toward vibration operating under such conditions also makes relatively easy headway through more solid ground and tough felt layers. The applied non-roundness of the cutting discs in fact results in it being easier to dig into such ground and felt layers.

The cutting discs 11 in mutually adjacent position on the shaft 10 therein assume angular positions relative to each other such that the highest and lowest points of the cutting edges lie uniformly distributed in peripheral direction.

A further special feature of the device according to the invention is a flexible sliding strip 21 which is situated between each pair of cutting discs 11 located immediately adjacent of each other and which during operation lies resiliently on the strip of ground between the relevant cutting discs 11.

The sliding strips 21 are fixed to a horizontal mounting beam 22 extending in transverse direction just in front of the cutting discs 11. The mounting beam 22 is fixed height-adjustably with a number of support strips 23 to a leading frame cross beam 6.

In the drawn embodiment the sliding strips 21 incline rearward from the mounting beam 22 at a small angle. They are each assembled from a comparatively limp leaf spring 21a which extends in rearward direction beyond the vertical projection of the cutting disc-bearing shaft 10, and a stiffer leaf spring 21b which extends beyond the point where the sliding strip touches the ground. By thus constructing the sliding strips the bending stiffness increases as soon as the leaf spring 21a comes into contact with leaf spring 21b when it is pressed upward.

Leaf spring 21b thus serves as a resilient stop, from which moment the machine is supported by both leaf springs. Because leaf spring 21a is longer, the longer portion thereof will be able to follow the terrain due to the smaller bending stiffness.

In operation the sliding strips 21 thus together form a resilient support for the cutting disc assembly, which support can adapt easily to undulations occurring in the terrain due to the independently yielding sliding strips 21. In operation, when the lifting rod 3 of the tractor is lowered (FIG. 1), when a tractor is moving forward at a travel speed of for instance 4 km/h and a cutting disc assembly rotates at a speed of revolution of for instance 500 to 600 revolutions/min., the following forces act in downward direction, under the influence of which the device with its cutting disc assembly penetrates into the terrain for working. These forces are formed by the (possibly) vertically downward directed component of the pulling force exerted by means of the lifting rods 3 on the frame of the machine in addition to the weight of the device. The following forces in contrast act vertically upward: The reaction force changing in magnitude and direction of the ground on each of the rotating cutting discs 11, the reaction force of the ground on the shoes 16 which varies from shoe to shoe 16 but which is in total virtually constant, the reaction force of the ground on the cleavage forces exerted by the cutting discs 17 which varies from cutting disc 17 to cutting disc 17 but which is in total virtually constant, and the reaction force of the ground on the sliding strips 21.

Figure 6:
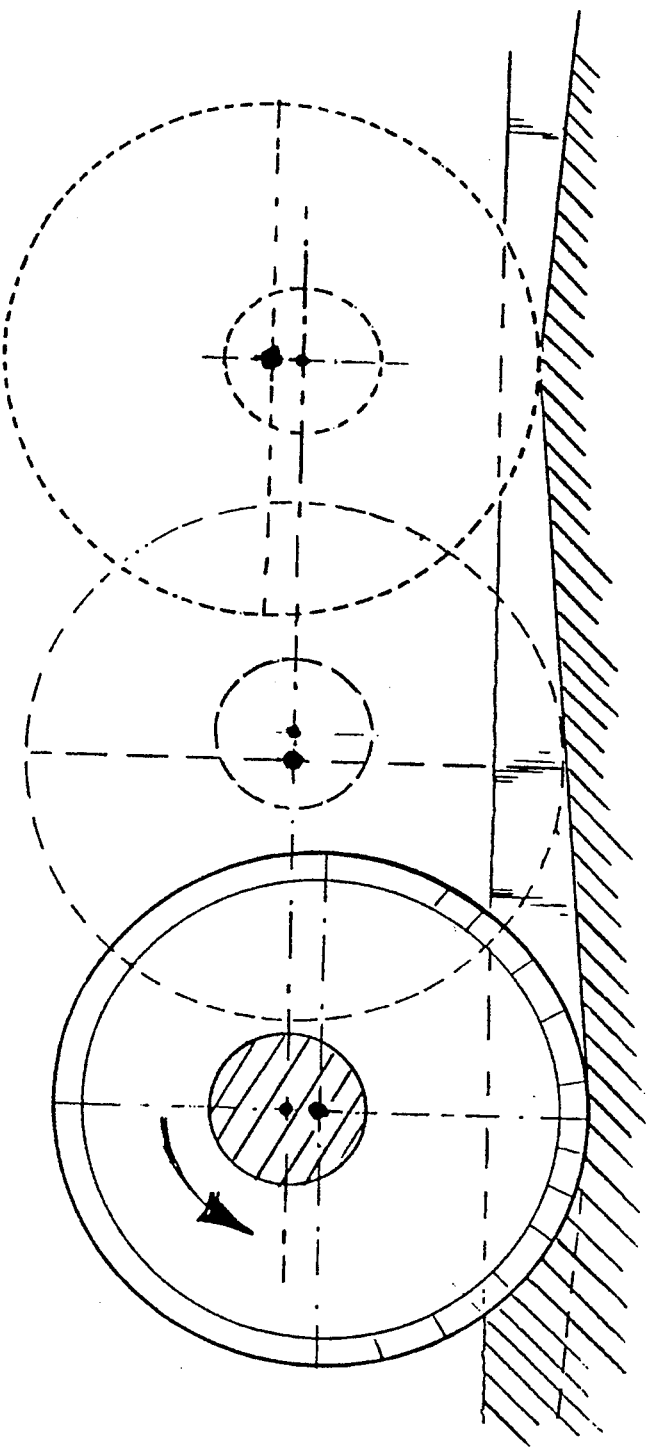
FIG. 6 shows the movement of an eccentrically mounted disc.

The above described embodiments of the non-round cutting discs according to the invention in fact relate to cutting discs with two larger and two smaller "lobes". It will be apparent that other embodiments are also conceivable. Even a "single-lobed" cutting disc can be envisaged consisting of a circular disc whereof the shaft is located eccentrically and which can therefore still be considered a non-round disc in the sense of the present invention, as shown in FIGS. 5 and 6.

When a greater cutting depth is desired or when it is wished to retain a determined cutting depth in the case of a heavier ground or a tougher felt layer, the lifting-/pulling rod 3 can be engaged at 8, at a higher point 9 of the frame 5, whereby the vertically downward directed component of the exerted pulling force is correspondingly enlarged. Designated with 25 is a second coupling element between tractor and seed furrow cutting device which normally—during operation—hangs slack but which nevertheless plays a part in lifting the device out of the ground using the lifting rod mechanism 3.

I claim:

1. A method for making sowing furrows in a lawn with a furrowing device comprising:
    disposing a device for making sowing furrows in a lawn, said device comprising:
    a mobile frame;
    a plurality of flat, planar elliptical cutting discs attached to said frame and disposed adjacently of each other transversely of the direction of forward movement thereof and drivable around a horizontal shaft, each of said cutting discs having a cutting edge having at least one outwardly protruding lobe, wherein each of said cutting discs is configured to penetrate a felt layer of the lawn and, wherein the distance between said cutting edge and said shaft continually varies;
    the method further comprising the steps of:
    exerting a force N on the ground by said cutting edge of said cutting disc;
    rotating the cutting disc as the furrowing device moves across the ground such that the plane of the disc is parallel to the direction of forward movement of the device;
    continually changing the direction and magnitude of the force N; and
    making a furrow in the lawn.

2. A method for sowing furrows as set forth in claim 1 wherein said furrowing device further comprises a stationary cutting knife attached to said frame, said cutting knife positioned behind the path of said cutting disc, said method further comprising the steps of:
    deepening and widening said furrow by said cutting knife.

3. The method as claimed in claim 2 further comprising the steps of placing grass seed in said furrows.

* * * * *